United States Patent [19]

Yan et al.

[11] Patent Number: 4,806,481
[45] Date of Patent: Feb. 21, 1989

[54] STREPTOCOCCUS SOJALACTIS

[75] Inventors: Huang Y. Yan; Wang D. Peng, both of Beijing, China

[73] Assignee: Taishi Foods Company Ltd., Aomori, Japan

[21] Appl. No.: 13,293

[22] Filed: Feb. 10, 1987

Related U.S. Application Data

[62] Division of Ser. No. 687,238, Dec. 28, 1984, Pat. No. 4,664,919.

[51] Int. Cl.$^4$ ............................ C12N 1/20; C12N 1/46
[52] U.S. Cl. .................................... 435/253.4; 426/46; 426/43; 435/885
[58] Field of Search ........................ 426/43, 44, 39, 46, 426/52, 634, 61; 435/885, 253

[56] References Cited

U.S. PATENT DOCUMENTS

| | | | |
|---|---|---|---|
| 3,096,177 | 7/1963 | Ariyama | 426/46 |
| 3,364,034 | 1/1968 | Hoersch et al. | 426/46 |
| 3,937,843 | 2/1976 | Osaka et al. | 426/46 |
| 3,944,676 | 3/1976 | Fridman | 426/46 |
| 3,950,544 | 7/1976 | Pavey | 426/43 |
| 3,982,025 | 9/1976 | Hashimoto et al. | 426/46 |
| 4,664,919 | 5/1987 | Yan et al. | 426/46 |

*Primary Examiner*—Jeanette Hunter
*Attorney, Agent, or Firm*—Armstrong, Nikaido, Marmelstein & Kubovcik

[57] ABSTRACT

The inventor has separated lactobacillus of new kind from soybean processed food, *Streptococcus sojalactus*. The lactobacillus falls under streptococcus, lactobacillaceae, eubacteriales. This bacterium well grows within the bean soup to make yogurt like food free from smell peculiar to bean soup having good taste without additive.

2 Claims, No Drawings

STREPTOCOCCUS SOJALACTIS

This is a division of application Ser. No. 687,238, filed Dec. 28, 1984, now U.S. Pat. No. 4,664,919.

BACKGROUND OF THE INVENTION

1. Field of the Invention

The present invention relates to a method which uses newly separated lactobacillus to ferment bean soup or processed and controlled (treatment such as sterilization, deodorization, constituent control, etc.) bean soup to produce yogurt like food.

2. Description of the Prior Art

Technologies for using lactobacillus to ferment bean soup have been widely known but a few of them have now been put to practical use. The greatest reason is that in lactobacillus heretofore used for fermented soup, lactobacillus beverages, etc. lactic acid in bean soup is less produced and therefore, auxiliary coagulant, stabilizer or souring materal need to be added, as a consequence of which process of manufacture becomes complicated and flavor and taste are deteriorated.

SUMMARY OF THE INVENTION

In view of the foregoing, the inventor has researched lactobacillus which can make yogurt like food which grows well in bean soup, produces a sufficient amount of lactic acid and obtains good flavor and taste without addition of coagulant, stabilizer and souring material. As a result, it has been found that when lactobacillus separated from soy-bean processed food is cultured in bean soup, it grows well and a large amount of lactic acid are produced. In lactobacillus heretofore known, for example, in those described in Japanese Patent Publication No. 22070/76, 200–250 mg % of lactic acid are merely produced by culture for 12 hours at 40° C. but in the present strain, 400-500 mg % of lactic acid are produced by culture for 6 hours at 40° C., and bean soup is completely aggregated, presenting yogurt like properties.

Newly separated lactobacillus has been classified in accordance with Bergey's Manual of Determinative Bacteriology, Vol. 8, and it has been judged to belong to streptococcus. However, on close investigation of bacteriological properties thereof, bacterium having the same properties as that of the present bacterium is not described in said Vol. 8 and other references, and the inventor regards it as a new kind, and called "streptococcus sojalactis". The bacteriological properties thereof are as follows:

(1) Morphological properties (glucose, bouillon culture medium)
(1) Cell shape Normally, spherical bacterium or circular bacterium forming more than 10 chains
(2) Size 1–1.2 micron
(3) formation of spore none
(4) Flagellum none
5) Motility none
6) Gram dying positive
(7) Anti-oxidizing properties none

| (2) Physiological properties | | |
|---|---|---|
| (1) Demand of oxygen, faculative anaerobic properties | | |
| (2) Growth PH | PH = 4.0 | Grows |
| | PH = 4.4 | Grows |
| | PH = 5.0 | Grows |
| | PH = 6.0 | Grows |
| | PH = 7.0 | Grows |
| | PH = 8.0 | Not grow |
| | PH = 9.6 | Not grow |
| (3) Growing temperature | 10° C. | Not grow |
| | 20° C. | Not grow |
| | 30° C. | Grows |
| | 37° C. | Grows |
| | 40° C. | Grows |
| | 45° C. | Not grow |
| (4) Salt resisting prop. | 2% salt | Grows |
| | 3% salt | Grows |
| | 4% salt | Growth is doubtful |
| | 6.5% salt | Not grow |
| (5) Heat resistance | Heating for 5 min. at 55° C. | Grows |
| | Heating for 5 min. at 60° C. | Not grow |
| (6) V.P reaction | Negative | |
| (7) M.R test | Positive | |
| (8) Liquefaction of gelatin | | Not liquefied |
| (9) Decomposition of starch | | Not decomposed |
| (10) Decomposition of caseine | | Not decomposed |
| (11) Formation of indole | | Not formed |
| (12) Formation of hydrogen sulfide | | Not formed |
| (13) Reduction of nitrite | | Not reduced |
| (14) Formation of ammonia from arginine | | Not formed |
| (15) Penicillin resistance | | None |
| (16) Reduction of nitrate | | Not reduced |
| (17) Catalase activity | | None |
| (18) Oxidase activity | | None |
| (19) Assimilation of citric acid | | Not assimilated |
| (20) Decomposition of hippuric acid | | Not composed |
| (21) Fermentativeness of saccharides (One which is fermented to form lactic acid is +, and one which is not fermented is −) | | |
| (a) Arabinose | − | |
| (b) Xylose | − | |
| (c) Glucose | + | |
| (d) Fructose | − | |
| (e) Galactose | ± | |
| (f) Thulbitole | − | |
| (g) Mannose | − | |
| (h) Ramnose | − | |
| (i) Schucloth | + | |
| (j) Maltose | − | |
| (k) Trehalose | − | |
| (l) Raffinose | − | |
| (m) Dextrin | − | |
| (n) Starch | − | |
| (o) Inulin | − | |
| (p) Glycerol | − | |
| (q) Mannitol | − | |
| (r) Thulbit | − | |
| (s) Salicin | − | |
| (t) Lactose | + | |
| (22) Generation of gas | | Not generated |

(3) State of Growth
(1) Litmus milk is reduced and solidified.
(2) Methylene blue milk. Not grown by 0.1% methylene blue milk.
(3) Sodium azide culture medium. Grown by 0.02% sodium azide culture medium.
(4) TTC (2.3.5. triphenyltetradium) culture medium. Grown by 0.02% TTC culture medium.
(5) 40% bile culture medium. Grows.
(6) Coloring matter. Not formed
(4) Others
(1) Hemolysis Alpha hemolysis is presented.
(2) Lancefield antigen antibody reaction
N group Reaction at 1:1–1:4
Q group Reaction at 1:2–1:4
O Group No reaction On search of the classificatory position of the present bacterium by the above-described Bergey's Manual on the basis of the aforementioned properties, it falls under streptococcus, lactobacillaceae, eubacteriales. When comparing it with a known bacterium belonging to streptococcus, it is approximate to *streptococcus cremoris, streptococcus lactis* and *streptococcus mitis*. However, there are some differences from these bacteria in main characteristics. Table I gives a comparison in nature between known lactobacillus and newly separated bacterium.

TABLE I

Comparison Between Known Lactobacillus and Newly Separated Bacterium

|  | Newly separated bacterium | *Str. soya | Str. themophilus | Str. lactis | Str. cremoris | Str. mitis |
|---|---|---|---|---|---|---|
| Growing temp. 10° C. | − | + | − | − | + | − |
| 45 | − | + | + | − | − | + or − |
| 50 | − | − | + | − | − | − |
| Heat resistance (60° C., 30 min.) | − | + | + | − | − | − |
| Reduction of litmus | + | − | − | + | + | + |
| Growth with 0.1% methylene blue milk | + | − | − | + | + or − | − |
| Formation of ammonia from arginine | − | + | − | + | − | + or − |
| Growth with 40% bile culture medium | + | Not grown with 10% deoxycole acid culture medium | − | + | + | − |
| Utilization of sugar |  |  |  |  |  |  |
| raffinose | − | + | ± | − | − | + or − |
| saccharose | + | + | + | ± | − | + |
| lactose | + | − | + | + | + | + |
| Hydrolysis of starch | − | − | + | − | − | − |
| Growth with 0.05% TTC culture medium | − | + | + | ND | + | ND |
| Growth with 0.03% sodium azide culture medium | + | − | ± | ND | + | ND |
| Hemolysis | α | r | α | weak α-r | weak α-r | α |

*Cited reference: Japanese Patent Publication No. 51-22070 (BIKOKWNKINYO No. 1837)
ND . . . No data
± . . . Reaction indefinite
+ or − . . . Positive or negative depending on strain In view of the fact that the Lancefield serum group is also different from the above-described bacterium, it has been judged to be a new bacterium and called *streptococcus sojalactis*.

The applicant deposited the present bacterium with the Microorganism Research Institute of Industrial Technology, Agency of Industrial Science & Technology, and Entrustment No. thereof is No. 6926 (FERM-P-6926).

DETAILED DESCRIPTION OF THE INVENTION

In the following, a description will be given of a method for producing lactic-acid fermented bean soup using the present bacterium. A first characteristic of the present bacterium is to grow only bean soup as a culture group and to form lactic acid. Generally, lactobacillus used to produce fermented soup must have lactose or glucose. However, since a necessary amount of lactose and glucose is not present in the bean soup, the growth of lactobacillus is not good, the bean soup is not solidified, and formation of lactobacillus is extremely small. Accordingly, it has been necessary to add lactose or glucose in order to make yogurt like food with bean soup as material. Since the present bacterium can grow making use of schuclose present in bean soup, saccharides are not always necessary to be added but yogurt like food may be produced only by bean soup.

Table II gives the state of growth of typical lactobacillus in bean soup with change in PH and value of titratable acidity.

TABLE II

Growth of Various Lactobacillus in Bean Soup
(16-hour culture)

| Kind of Lactobacillus | Final PH | Titratable Activity % |
|---|---|---|
| Before culture | 6.40 | 0.14 |
| Streptococcus lactis | 5.93 | 0.30 |
| Streptococcus cremoris | 6.08 | 0.27 |
| Streptococcus thermophilus | 4.40 | 0.49 |
| Streptococcus diacetilactis | 5.83 | 0.27 |
| Lactobacillus delbruecki | 4.80 | 0.42 |
| Lactobacillus bulgraicus | 6.32 | 0.21 |
| Lactobacillus casei | 6.18 | 0.17 |
| Present strain | 4.25 | 0.56 |

A second characteristic of the present bacterium is that a solid material obtained by fermenting bean soup is excellent in taste. Important factors influencing on the taste of lactic acid fermented bean soup include, in addition to the amount of formation of lactic acid previously mentioned, removal of greens' smell peculiar to soybeans and the amount of formation of aroma constituent (such as diacetyl, acetone, etc.) peculiar to lactobacillus products. The present strain is characterized in that the force for removing smell of soybeans is great and the amount of formation of diacetyl and acetone is larger than that of other lactobacillus. Table III gives comparison of taste of solidified material obtained by culture in bean soup between various lactobacillus and the present bacterium.

TABLE III

Properties and Taste of Fermented Bean Soup by Various Lactobacillus

| Kind of Lactobacillus | Nature of solidified material | Presence of smell of soybean | Presence of smell of acetone, diacetyl | Acidity | Unpleasant smell |
|---|---|---|---|---|---|
| S. thermophilus | solidified | + | ± | ++ | − |
| S. lactis | not solidified | ++ | − | − | + |
| S. diacetilactis | Weakly solidified | + | − | − | + |
| L. bulgaricus | not solidified | ++ | − | − | − |
| L. acidophilus | solidified | + | − | − | + |
| S. cremoris | weakly solidified | + | − | − | + |
| Present strain | solidified | ± | ++ | ++ | − |

(++ very strong, + strong, ± almost none, − none at all)

DESCRIPTION OF THE PREFERRED EMBODIMENTS

Embodiments of the present invention will be described hereinafter.

Embodiment 1

Soybeans as material are well cleaned, after which they are immersed into a flow at 14° to 15° for 16 to 18 hours to sufficiently absorb water. Next, the material is crushed while adding water of about 7 times thereto, and then heated and filtered to obtain bean soup. The bean soup is adjusted to have suitable density of solid in the range 6.5% to 5.5%, after which sweetenings, spices or the like are added or not added depending on one's taste while maintaining high temperature, and cooled to approx. 40° C. The thus prepared bean soup is inoculated with a cultured liquid, in the range of 4 to 6%, of the present bacterium separately purely cultured, well stirred and mixed, immediately filled into a commercially available contaier, and sealed, after which it is fermented for 6 hours at 40° C. As a result, the whole bean soup is evenly and completely solidified, and final PH thereof is 4.25 and the amount of formed lactic acid is 410 mg %. As previously mentioned, the properties were such that the greens' smell peculiar to soybean was disappeared, the product has yogurt like smell and fermented bean soup of moderate acidity was obtained.

Embodiment 2

15–20% of juice neutralized and sterilized before hand is added to bean soup whose soldi density is adjusted to 7.0–7.5% to adjust PH to more or less 6.40, after which the cultured liquid of the present bacterium of 4 to 6% is inoculated and fermented to obtain yogurt like products.

Embodiment 3

Bean soup prepared similarly to Embodiment 1 is introduced into a culture tank sterilized before hand, into which 4–6% of cultured liquid of the present bacterium is added. They are cultured for 6 to 8 hours while maintaining a temperature at 40° C., after which they are crushed into which pectin or the like as a stabilizer is added and thereafter homogenized by a homogenizer to thereby obtain liquid-like lactic-acid fermented bean soup.

What is claimed is:
1. A bacterium culture wherein consisting of *Streptococcus sojalactis*, Budapest Treaty Deposit No. FERM B.P. 1597.
2. The bacterium culture defined by claim 1, wherein the culture is biologically pure *Streptococcus sojalactis*, Budapest Treaty Deposit No. FERM B.P. 1597.

* * * * *